(12) United States Patent
Reichart et al.

(10) Patent No.: US 6,413,573 B1
(45) Date of Patent: Jul. 2, 2002

(54) FLAVOR COMPOSITION

(75) Inventors: Glenn Reichart, Southbury, CT (US); Kim W. Hyung, Irvington, NY (US); Nikhil Prasad, New Milford, CT (US)

(73) Assignee: Nestac, S.A., Vevey (CH)

( * ) Notice: Subject to any disclaimer, the term of this patent is extended or adjusted under 35 U.S.C. 154(b) by 0 days.

(21) Appl. No.: 09/604,370

(22) Filed: Jun. 27, 2000

(51) Int. Cl.$^7$ .............................................. A23L 1/221
(52) U.S. Cl. .................. 426/650; 426/89; 426/103; 426/534
(58) Field of Search .................. 426/650, 89, 103, 426/534, 450, 516

(56) References Cited

U.S. PATENT DOCUMENTS

| | | | |
|---|---|---|---|
| 4,232,047 A | 11/1980 | Sair et al. | 426/96 |
| 4,689,235 A | 8/1987 | Barnes et al. | 426/89 |
| 4,820,534 A | 4/1989 | Saleeb et al. | 426/96 |
| 5,009,900 A | 4/1991 | Levine et al. | 426/96 |
| 5,087,461 A | 2/1992 | Levine et al. | 426/96 |
| 5,603,971 A * | 2/1997 | Porzio et al. | 426/96 |
| 5,846,580 A | 12/1998 | Franke et al. | 426/62 |
| 6,248,386 B1 * | 6/2001 | Willibald-Ettle et al. | 426/516 |

FOREIGN PATENT DOCUMENTS

| | | |
|---|---|---|
| WO | 86/00502 | 1/1986 |
| WO | 94/23593 | 10/1994 |
| WO | 96/38055 | 12/1996 |

OTHER PUBLICATIONS

Mesters, P., AN 96(08):K0017 FSTA, abstracting Manufacturing Confectioner, 1995, 75(11), 61–63.*
anon., AN 1999(07):K0106 FSTA, abstracting Food Marketing & Technology, 1998, 12(4), 16.*

* cited by examiner

*Primary Examiner*—Leslie Wong
(74) *Attorney, Agent, or Firm*—Winston & Strawn

(57) ABSTRACT

A flavor composition in the form of a homogeneous emulsion including a flavor encapsulated in a glassy carbohydrate matrix composed of a composition comprising a blend of polydextrose and lactitol. When the matrix contains less than 3.5% water, it has a glass transition temperature above 40° C. so that it remains stable at room temperature storage conditions. Also, process for making this flavor composition.

11 Claims, No Drawings

FLAVOR COMPOSITION

FIELD OF THE INVENTION

The present inventions relates to a flavor composition and more particularly to a flavor encapsulated in a glassy carbohydrate matrix composed of a composition comprising a blend of polydextrose and lactitol.

BACKGROUND OF THE INVENTION

There is a long history of patents being issued for flavor encapsulation via extrusion of carbohydrate glasses, e.g., U.S. Pat. Nos. 5,009,900, 5,087,461, 5,603,971, 4,232,047, 4,820,534, and 4,689,235 and International Patent Applications WO 94/23593, WO 96/38055, WO 98/20756, and WO 86/00502. All these patents and patent applications disclose the requirement of adding water or other plasticizer during the extrusion process, and this inhibits the glassy property of the matrix. For this reason, improvements in such materials are needed.

SUMMARY OF THE INVENTION

We have found that a composition comprising a blend of polydextrose and lactitol eliminates the need for the addition of water or other plasticizers) in the extrusion. This blend improves the encapsulation properties of the technique, since the presence of other than small amounts of water, for instance above about 3 to 3.5% by weight, in the final product will inhibit the glassy properties of the carbohydrate matrix. It also eliminates the need for any plasticizer removal techniques mentioned in, for example, U.S. Pat. No. 5,603,971. Furthermore, the shelf life of the product is also extended because it will ensure that the glass transition temperature is above room temperature (i.e., representative of shelf life conditions) during storage.

Accordingly, the present invention relates to a flavor composition in the form of a homogeneous emulsion comprising a flavor encapsulated in a glassy carbohydrate matrix composed of a composition comprising a blend of polydextrose and lactitol.

DETAILED DESCRIPTION OF THE INVENTION

The amount of flavor in the composition may be up to about 30%, preferably is from about 0.1 to 25%, and more usually from about 0.5 to 20% by weight based on the weight of the composition.

The invention is particularly advantageous for savory flavors with examples of such flavors being tomato, chicken, beef and other grilled flavors.

The matrix provides an effective barrier against both diffusion and oxidation because of its low permeation properties in the glassy state. The matrix composition is preferably adjusted to ensure it retains its glass behavior in typical storage conditions.

The matrix material may contain small quantities of an emulsifier, e.g. from about 0.1 to 5% and preferably from about 0.5 to 3.5% by weight of the matrix. The purpose of the emulsifier is to create a homogeneous product at the extruder outlet so that the flavor receives maximum protection from the matrix.

The amount of lactitol in the blend of polydextrose and lactitol may be from about 5 to 50%, preferably from 10 to 40%, and more preferably from 15 to 35% by weight based on the weight of the blend.

The flavor composition in the form of a homogeneous emulsion comprising a flavor encapsulated in a glassy carbohydrate matrix may be prepared by feeding a blend of polydextrose, lactitol and, preferably, small quantities of an emulsifier into an extruder, mixing, and heating up to from about 90° C. to 130° C., preferably from 100° C. to 125° C., adding the flavor to this blend, and transporting the entire mixture with mixing along the extruder barrel to the exit where the homogeneous emulsion exits via a die on the extruder outlet, is cooled to room temperature via ambient air, and is ground into a powder, e.g. through a 4 mm mesh screen.

Any emulsifier with a hydrophilic/lipophilic balance (HLB) in the range of about 3 to 10 may be used, preferably an emulsifier with a HLB Value in the range of 6 to 9. The emulsifier may be, for instance, Panodan® 150K (Danisco), a blend of diacetyl tartaric acid ester with mono-diglyceride with a HLB value between 7 and 8 which works effectively in the system. Other esters having the recited HLB values may be used.

While the technology of extrusion to improve flavor shelf life has been described in numerous patents and literature, this is the first known use of the polydextrose/lactitol blend combination as the carbohydrate matrix. In order to provide adequate flavor protection, this matrix material must have the following characteristics:

1) A glass transition temperature high enough to ensure the system remains in the glassy state throughout storage conditions. A matrix material in the glassy state will have very low diffusion values, thus preventing loss of the flavor component. This must be accomplished not only for the flavor system, but also for any applications in which it would be stored.

2) The ability to form a homogeneous emulsion between the flavor and matrix components. This may be facilitated by the addition of a small amount of emulsifier.

Polydextrose has a relatively high glass transition temperature, but is a hydroscopic material (Aw value of 0.07 at 20.6° C.). The glass transition temperature drops as moisture is added, so that the use of polydextrose in a flavor system with higher moisture content would be expected to result in unacceptable glass transition behavior.

We have found to the contrary that, in order to obtain a high glass transition temperature without the full hydroscopic behavior exhibited by pure polydextrose, the amount of water in the blend of polydextrose and lactitol is preferably less than 3.5% by weight, and more preferably less than 3% by weight based on the weight of the blend, to achieve a glass transition temperature that is above 40° C. Especially preferred water contents are less than 2.5% by weight based on the weight of the blend. The desired amount of water is conveniently achieved by not adding water for extrusion.

EXAMPLES

The following Examples further illustrate the present invention.

Example 1

A blend of 74 parts of polydextrose, 24 parts of lactitol, and 2 parts of Panodan® 150K (Danisco), a blend of diacetyl tartaric acid ester with mono-diglyceride, was fed into an extruder, mixing, and heating up to 120° C., adding 3 parts of a liquid flavor (FIS Tomato Booster Flavor) to this blend, and transporting the entire mixture with mixing along the extruder barrel in which the screws turn at 150 RPM, to the exit where the homogeneous emulsion exits at approximately 5 kg/hr during steady state operation via a die on the extruder outlet, is cooled to room temperature via ambient air, and is ground into a powder, e.g. through a 4 mm mesh screen. The moisture content is 2.5% by weight. The final mean (average) particle size is less than 300 microns.

The glass transition temperature was above room temperature, ensuring the material will remain in the glass state under normal storage conditions.

Examples 2 to 4

A similar procedure to Example 1 was carried out but using the following flavors in the amounts indicated:

FIS Chicken Booster Flavor POU49—5 parts
FIS Beef Booster Flavor 1.23.20—2 parts
FIS Grilled Booster Flavor #4.24—4 parts The glass transition temperatures were above room temperature, ensuring the material will remain in the glass state under normal storage conditions.

What is claimed is:

1. A process for preparing a flavor composition in the form of a homogeneous emulsion that is free of added plasticizer comprising a flavor encapsulated in a glassy carbohydrate which comprises feeding a blend of polydextrose and lactitol into an extruder, mixing, and heating to a temperature of 90° C. to 130° C., adding the flavor to this blend, and transporting the entire mixture with mixing along the extruder to an exit where the homogeneous emulsion exits via a die on the extruder, is cooled to room temperature via ambient air, and is ground into a powder.

2. A process according to claim 1 wherein an emulsifier is mixed with the polydextrose and lactitol in the extruder.

3. The method according to claim 1 wherein the amount of flavor in the composition is from about 0.1 to 25% by weight based on the weight of the composition.

4. The method according to claim 1 wherein the flavor is a tomato, chicken, beef or grilled flavor.

5. The method according to claim 1 wherein the matrix material contains from about 0.1 to 5% by weight of an emulsifier based on the weight of the matrix.

6. The method according to claim 5 wherein the hydrophilic lipophilic balance (HLB) of the emulsifier is in the range of from about 3 to 10.

7. The method according to claim 5 wherein the emulsifier is an ester.

8. The method according to claim 5 wherein the emulsifier is a blend of diacetyl tartaric acid ester with mono-diglyceride.

9. The method according to claim 1 wherein the amount of lactitol in the blend of polydextrose and lactitol is from about 5 to 50% based on the weight of the blend.

10. The method according to claim 1 wherein water is not added during the extrusion so that the amount of water in the blend of polydextrose and lactitol is less than 3.5% based on the weight of the blend.

11. The method according to claim 10 wherein the amount of water is less than about 3% based on the weight of the blend so that a glass transition temperature that is above 40° C. is achieved.

* * * * *

UNITED STATES PATENT AND TRADEMARK OFFICE
CERTIFICATE OF CORRECTION

PATENT NO.    : 6,413,573 B1
DATED         : July 2, 2002
INVENTOR(S)   : Reichart et al.

It is certified that error appears in the above-identified patent and that said Letters Patent is hereby corrected as shown below:

<u>Title page,</u>
Item [75], Inventors, change "Kim W. Hyung" to -- Hyung W. Kim --.
Item [73], Assignee, change "Nestac, S.A." to -- Nestec, S.A. --.

Signed and Sealed this

Twelfth Day of August, 2003

JAMES E. ROGAN
*Director of the United States Patent and Trademark Office*